United States Patent
Wu et al.

(10) Patent No.: US 10,778,980 B2
(45) Date of Patent: Sep. 15, 2020

(54) ENTROPY DECODING APPARATUS WITH CONTEXT PRE-FETCH AND MISS HANDLING AND ASSOCIATED ENTROPY DECODING METHOD

(71) Applicant: MEDIATEK INC., Hsin-Chu (TW)

(72) Inventors: Ming-Long Wu, Hsinchu (TW); Chia-Yun Cheng, Hsinchu (TW); Yung-Chang Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/677,598

(22) Filed: Nov. 7, 2019

(65) Prior Publication Data

US 2020/0154108 A1    May 14, 2020

Related U.S. Application Data

(60) Provisional application No. 62/760,982, filed on Nov. 14, 2018.

(51) Int. Cl.

| *H04N 19/13* | (2014.01) |
| *H04N 19/44* | (2014.01) |
| *G06F 9/38* | (2018.01) |
| *H04N 19/172* | (2014.01) |
| *H04N 19/70* | (2014.01) |

(52) U.S. Cl.
CPC ............ *H04N 19/13* (2014.11); *G06F 9/3802* (2013.01); *G06F 9/3818* (2013.01); *H04N 19/172* (2014.11); *H04N 19/44* (2014.11); *H04N 19/70* (2014.11)

(58) Field of Classification Search
CPC ...... H04N 19/13; H04N 19/44; H04N 19/172; H04N 19/70; G06F 9/3802; G06F 9/3818
See application file for complete search history.

(56) References Cited

U.S. PATENT DOCUMENTS

| 2005/0175250 A1* | 8/2005 | Watanabe | H04N 19/436 |
| | | | 382/247 |
| 2010/0097250 A1* | 4/2010 | Demircin | H04N 19/61 |
| | | | 341/107 |

* cited by examiner

*Primary Examiner* — Shawn S An
(74) *Attorney, Agent, or Firm* — Winston Hsu

(57) ABSTRACT

An entropy decoding apparatus includes an entropy decoding circuit, a pre-fetch circuit, and a context pre-load buffer. The pre-fetch circuit pre-fetches at least one candidate context for entropy decoding of a part of an encoded bitstream of a frame before the entropy decoding circuit starts entropy decoding of the part of the encoded bitstream of the frame. The context pre-load buffer buffers the at least one candidate context. When a target context actually needed by entropy decoding of the part of the encoded bitstream of the frame is not available in the context pre-load buffer, the context pre-load buffer instructs the pre-fetch circuit to re-fetch the target context, and the entropy decoding circuit stalls entropy decoding of the part of the encoded bitstream of the frame.

20 Claims, 9 Drawing Sheets

ENTROPY DECODING APPARATUS WITH CONTEXT PRE-FETCH AND MISS HANDLING AND ASSOCIATED ENTROPY DECODING METHOD

CROSS REFERENCE TO RELATED APPLICATIONS

This application claims the benefit of U.S. provisional application No. 62/760,982, filed on Nov. 14, 2018 and incorporated herein by reference.

BACKGROUND

The present invention relates to video decoding, and more particularly, to an entropy decoding apparatus with context pre-fetch and miss handling and an associated entropy decoding method.

The conventional video coding standards generally adopt a block based coding technique to exploit spatial and temporal redundancy. For example, the basic approach is to divide a source frame into a plurality of blocks, perform prediction on each block, transform residuals of each block, and perform quantization, scan and entropy encoding. Besides, a reconstructed frame is generated in an internal decoding loop of the video encoder to provide reference pixel data used for coding following blocks. For example, inverse quantization and inverse transform may be included in the internal decoding loop of the video encoder to recover residuals of each block that will be added to predicted samples of each block for generating a reconstructed frame.

Generally speaking, a video decoder is used to perform an inverse of a video encoding operation performed at the video encoder. For example, the video decoder is equipped with functions, including entropy decoding, inverse quantization, inverse transform, intra prediction, motion compensation, etc., for recovering residuals of each block and generating a reconstructed frame. The video decoder performance, however, is bounded by entropy decoding performance due to a data dependency issue. Furthermore, a large and complex context table makes the problem become worse.

SUMMARY

One of the objectives of the claimed invention is to provide an entropy decoding apparatus with context pre-fetch and miss handling and an associated entropy decoding method.

According to a first aspect of the present invention, an exemplary entropy decoding apparatus is disclosed. The exemplary entropy decoding apparatus includes an entropy decoding circuit, a pre-fetch circuit, and a context pre-load buffer. The pre-fetch circuit is arranged to pre-fetch at least one candidate context for entropy decoding of a part of an encoded bitstream of a frame before the entropy decoding circuit starts entropy decoding of the part of the encoded bitstream of the frame. The context pre-load buffer is arranged to buffer said at least one candidate context, wherein when a target context actually needed by entropy decoding of the part of the encoded bitstream of the frame is not available in the context pre-load buffer, the context pre-load buffer instructs the pre-fetch circuit to re-fetch the target context, and the entropy decoding circuit stalls entropy decoding of the part of the encoded bitstream of the frame.

According to a second aspect of the present invention, an exemplary entropy decoding method is disclosed. The exemplary entropy decoding method includes: pre-fetching at least one candidate context for entropy decoding of a part of an encoded bitstream of a frame before entropy decoding of the part of the encoded bitstream of the frame is started; buffering, by a context pre-load buffer, said at least one candidate context; and when a target context actually needed by entropy decoding of the part of the encoded bitstream of the frame is not available in the context pre-load buffer, re-fetching the target context and stalling entropy decoding of the part of the encoded bitstream of the frame.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
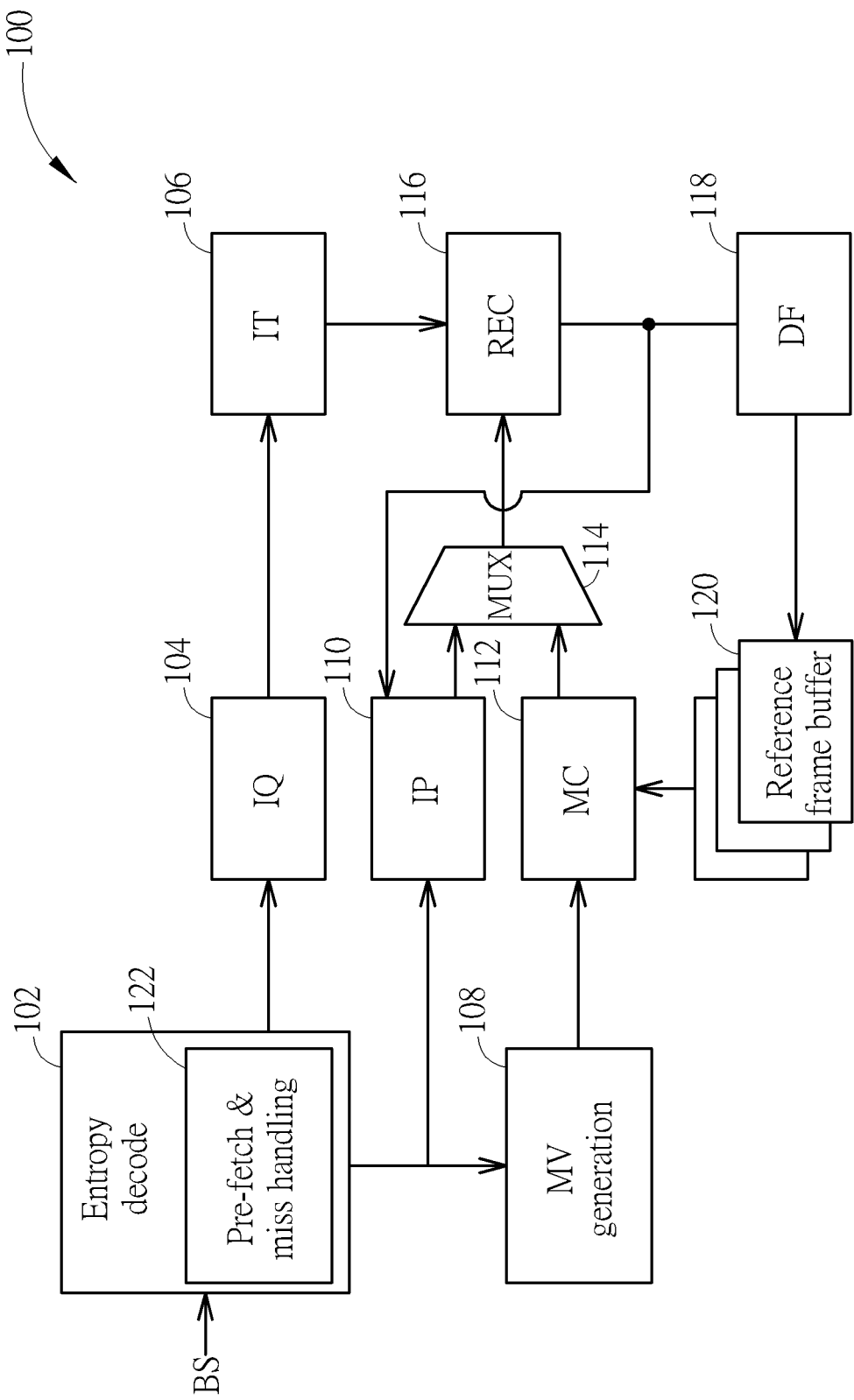
FIG. 1 is a diagram illustrating a video decoder according to an embodiment of the present invention.

FIG. 1 is a diagram illustrating a video decoder according to an embodiment of the present invention. By way of example, but not limitation, the video decoder 100 may be an AV1 video decoder. The video decoder 100 includes an entropy decoding apparatus (denoted by "Entropy decode") 102, an inverse quantization circuit (denoted by "IQ") 104, an inverse transform circuit (denoted by "IT") 106, a motion vector generation circuit (denoted by "MV generation") 108, an intra-prediction circuit (denoted by "IP") 110, a motion compensation circuit (denoted by "MC") 112, a multiplexing circuit (denoted by "MUX") 114, a reconstruction circuit (denoted by "REC") 116, a de-blocking filter (denoted by "DF") 118, and one or more reference frame buffers 120. The video decoder 100 decodes an encoded bitstream BS of a frame to generate a reconstructed frame. When a block is encoded by an intra-prediction mode, the intra-prediction circuit 110 is used to determine a predictor, and the reconstruction circuit 116 generates a reconstructed block according to the intra predictor output from the multiplexing circuit 114 and residue output from the inverse transform circuit 106. When a block is encoded by an inter-prediction mode, the motion vector generation circuit 108 and the motion compensation circuit 112 are used to determine a predictor, and the reconstruction circuit 116 generates a reconstructed block according to the inter predictor output from the multiplexing circuit 114 and residue output from the inverse transform circuit 106. A reconstructed frame generated from the reconstruction circuit 116 undergoes in-loop filtering (e.g., de-blocking filtering) before the reconstructed frame is stored into the reference fame buffer(s) 120 to serve as a reference frame.

Since a person skilled in the pertinent art can readily understand details of inverse quantization circuit 104, inverse transform circuit 106, motion vector generation circuit 108, intra-prediction circuit 110, motion compensation circuit 112, multiplexing circuit 114, reconstruction circuit 116, de-blocking filter 118, and reference frame buffer(s) 128, further description is omitted here for brevity.

To solve the problem of performance bottleneck of entropy decoding, the present invention proposes using the entropy decoding apparatus 102 equipped with a context pre-fetch and miss handling mechanism (denoted by "Pre-fetch & miss handling) 122. Further details of the proposed entropy decoder design are described as below.

Figure 2:
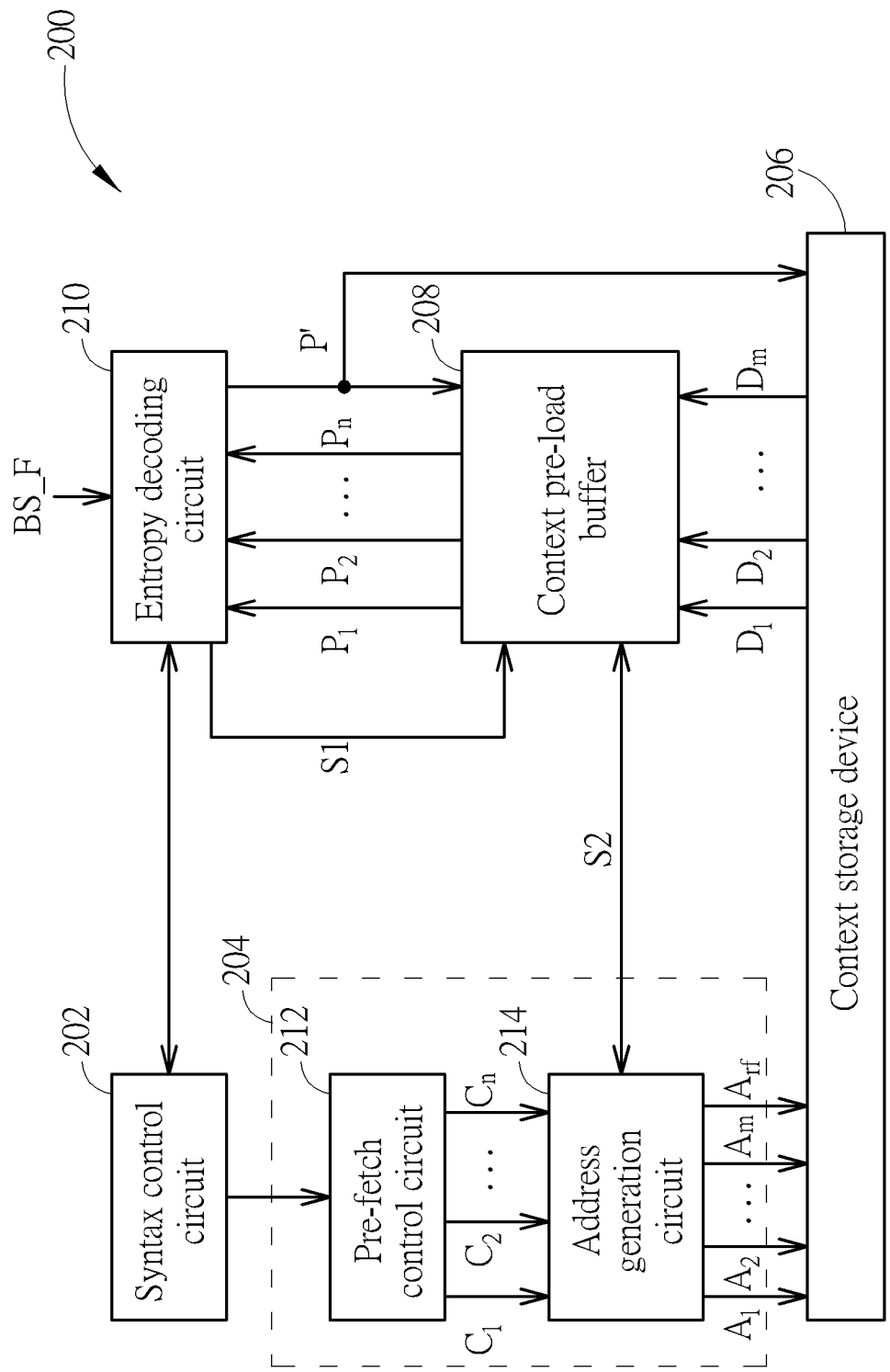
FIG. 2 is a diagram illustrating one entropy decoding apparatus according to an embodiment of the present invention.

FIG. 2 is a diagram illustrating one entropy decoding apparatus according to an embodiment of the present invention. The entropy decoding apparatus 102 shown in FIG. 1 may be implemented using the entropy decoding apparatus 200 shown in FIG. 2. The entropy decoding apparatus 200 includes a syntax control circuit 202, a pre-fetch circuit 204, a context storage device 206, a context pre-load buffer 208, and an entropy decoding circuit 210. The pre-fetch circuit 204 includes a pre-fetch control circuit 212 and an address generation circuit 214.

By way of example, but not limitation, the entropy decoding apparatus 200 is a part of an AV1 video decoder. Hence, the entropy decoding circuit 210 is arranged to perform non-binary entropy decoding upon an encoded bitstream BS_F of a frame. AV1 uses a symbol-to-symbol adaptive multi-symbol arithmetic coder. Each syntax element in AV1 is a member of a specific alphabet of N elements, and a context consists of a set of N probabilities together with a count to facilitate fast early adaptation. Since non-binary entropy decoding is adopted, an entropy context table is complex. Since each syntax (syntax element) has its probability values, the entropy context table is large. To improve the entropy decoding performance, the present invention proposes using a context pre-fetch mechanism. The pre-fetch circuit 204 is arranged to pre-fetch at least one candidate context for entropy decoding of a part (e.g., one syntax) of the encoded bitstream BS_F before the entropy decoding circuit 210 starts entropy decoding of the part of the encoded bitstream BS_F, and the context pre-load buffer 208 is arranged to buffer the at least one candidate context fetched from the context storage device 206. The context storage device 206 is arranged to store an entire context table (entire probability table) of a frame, while the context pre-load buffer 208 is arranged to store a partial context table (partial probability table) of the frame. In other words, contexts of all syntax (syntax elements) associated with one frame are available in the context storage device 206, while contexts of only a portion of syntax (syntax elements) associated with one frame are available in the context pre-load buffer 208.

In this embodiment, the context pre-load buffer 208 may be implemented using on-chip (internal) storage (e.g., static random access memory (SRAM) or flip-flips); and the context storage device 206 may be implemented using on-chip (internal) storage (e.g., SRAM or flip-flops), off-chip (external) storage (e.g., dynamic random access memory (DRAM), flash memory, or hard disk), or a combination of on-chip (internal) storage and off-chip (external) storage. However, these are for illustrative purposes only, and are not meant to be limitations of the present invention.

In a case where a context needed by the entropy decoding circuit 210 is pre-fetched and stored in the context pre-load buffer 208, the context pre-load buffer 208 can help the entropy decoding circuit 210 to get the needed context faster. In this way, the entropy decoding performance can be effectively improved. Further details of the context pre-fetch mechanism are described as below. The terms "syntax" and "syntax element" may be interchangeable in the following description.

The syntax control circuit 202 is arranged to deal with syntax parsing flow control. Hence, entropy decoding of syntax elements at the entropy decoding circuit 210 is controlled by the syntax control circuit 202. The pre-fetch control circuit 212 is arranged to monitor the syntax parsing flow control performed at the syntax control circuit 202, and refer to a current status of the syntax parsing flow control to predict a next syntax not yet decoded by the entropy decoding circuit 210 for building a candidate context list $(C_1, C_2, \ldots, C_n)$ that includes at least one candidate context determined by context prediction, where n is an integer not smaller than one (i.e., $n \geq 1$). The term "next syntax" may mean any "not-yet-decoded syntax" while a decoding process of a current syntax is in action.

The candidate context list $(C_1, C_2, \ldots, C_n)$ built by the pre-fetch control circuit 212 is provided to the address generation circuit 214. The address generation circuit 214 is arranged to determine at least one read address $(A_1, A_2, \ldots, A_m)$ according to the candidate context list $(C_1, C_2, \ldots, C_n)$, where m is an integer not larger than n (i.e., $n \geq m$). In this embodiment, the address generation circuit 214 is further arranged to monitor a buffer status of the context pre-load buffer 208, and refer to the buffer status of the context pre-load buffer 208 to remove at least one candidate context from the candidate context list $(C_1, C_2, \ldots, C_n)$ when the at least one candidate context is already buffered in the context pre-load buffer 208. For example, when a candidate context $C_i$ is already stored in the context pre-load buffer 208, the context pre-load buffer 208 keeps holding the existing candidate context $C_i$, and there is no need to fetch the candidate context $C_i$ from the context storage device 206 again. Hence, the candidate context $C_i$ is not involved in determination of the at least one read address $(A_1, A_2, \ldots, A_m)$ used to pre-fetch at least one candidate context from the context storage device 206.

The context storage device 206 outputs at least one candidate context $(D_1, D_2, \ldots, D_m)$ to the context pre-load buffer 208, where the at least one candidate context $(D_1, D_2, \ldots, D_m)$ is addressed by the at least one read address $(A_1, A_2, \ldots, A_m)$. Specifically, the candidate context $D_1$ is read from the context storage device 206 in response to the read address $A_1$, the candidate context $D_2$ is read from the context storage device 206 in response to the read address $A_2$, and the candidate context $D_m$ is read from the context storage device 206 in response to the read address $A_m$.

After the entropy decoding circuit 210 starts entropy decoding (particularly, non-binary entropy decoding) of a current syntax and before the entropy decoding circuit 210 starts entropy decoding (particularly, non-binary entropy decoding) of a next syntax, the context pre-load buffer 208 stores all candidate contexts ($P_1, P_2, \ldots, P_n$) as requested by the candidate context list ($C_1, C_2, \ldots, C_n$) that is built on the basis of a prediction of the next syntax, where $P_1=C_1$, $P_2=C_2, \ldots,$ and $P_n=C_n$.

In a case where a target context actually needed by entropy decoding (particularly, non-binary entropy decoding) of the next syntax is available in the context pre-load buffer 208 (i.e., the target context is one of candidate contexts ($P_1, P_2, \ldots, P_n$)), the entropy decoding circuit 210 selects the target context according to a decoding result of the current syntax, and obtains the target context from the context pre-load buffer 208 without accessing the context storage device 206. In some embodiments of the present invention, the read latency of the context pre-load buffer 208 is much lower than the read latency of the context storage device 206, and/or the date transfer rate of the context pre-load buffer 208 is much higher than the data transfer rate of the context storage device 206. In this way, entropy decoding benefits from low latency and/or high transfer rate of the context pre-load buffer 208 that stores the needed context in advance.

After entropy decoding (particularly, non-binary entropy decoding) of the next syntax is done, the entropy decoding circuit 210 applies adaptive update to the target context P' (which is one of candidate contexts ($P_1, P_2, \ldots, P_n$)) stored in context pre-load buffer 208 and/or context storage device 206.

In another case where a target context actually needed by entropy decoding (particularly, non-binary entropy decoding) of the next syntax is not available in the context pre-load buffer 208 (i.e., none of candidate contexts ($P_1, P_2, \ldots, P_n$) is the target context), a proposed miss handling mechanism is activated. For example, the entropy decoding circuit 210 stalls entropy decoding (particularly, non-binary entropy decoding) of the next syntax, and asserts a miss signal S1 to inform the context pre-load buffer 208 of a context miss event. The context pre-load buffer 208 generates a re-fetch signal S2 and outputs the re-fetch signal S2 to the address generation circuit 214 in response to the asserted miss signal S1. The address generation circuit 214 is further arranged to determine another read address $A_{rf}$ according to the re-fetch signal S2, where the target context is read from the context storage device 206 in response to another read address $A_{rf}$, and is provided to the entropy decoding circuit 210 via (or without via) the context pre-load buffer 208. After the target context fetched from the context storage device 206 is available to the entropy decoding circuit 210, the entropy decoding circuit 210 resumes entropy decoding (particularly, non-binary entropy decoding) of the next syntax. Similarly, after entropy decoding (particularly, non-binary entropy decoding) of the next syntax is done, the entropy decoding circuit 210 applies adaptive update to the target context P' stored in context pre-load buffer 208 and/or context storage device 206.

Figure 3:
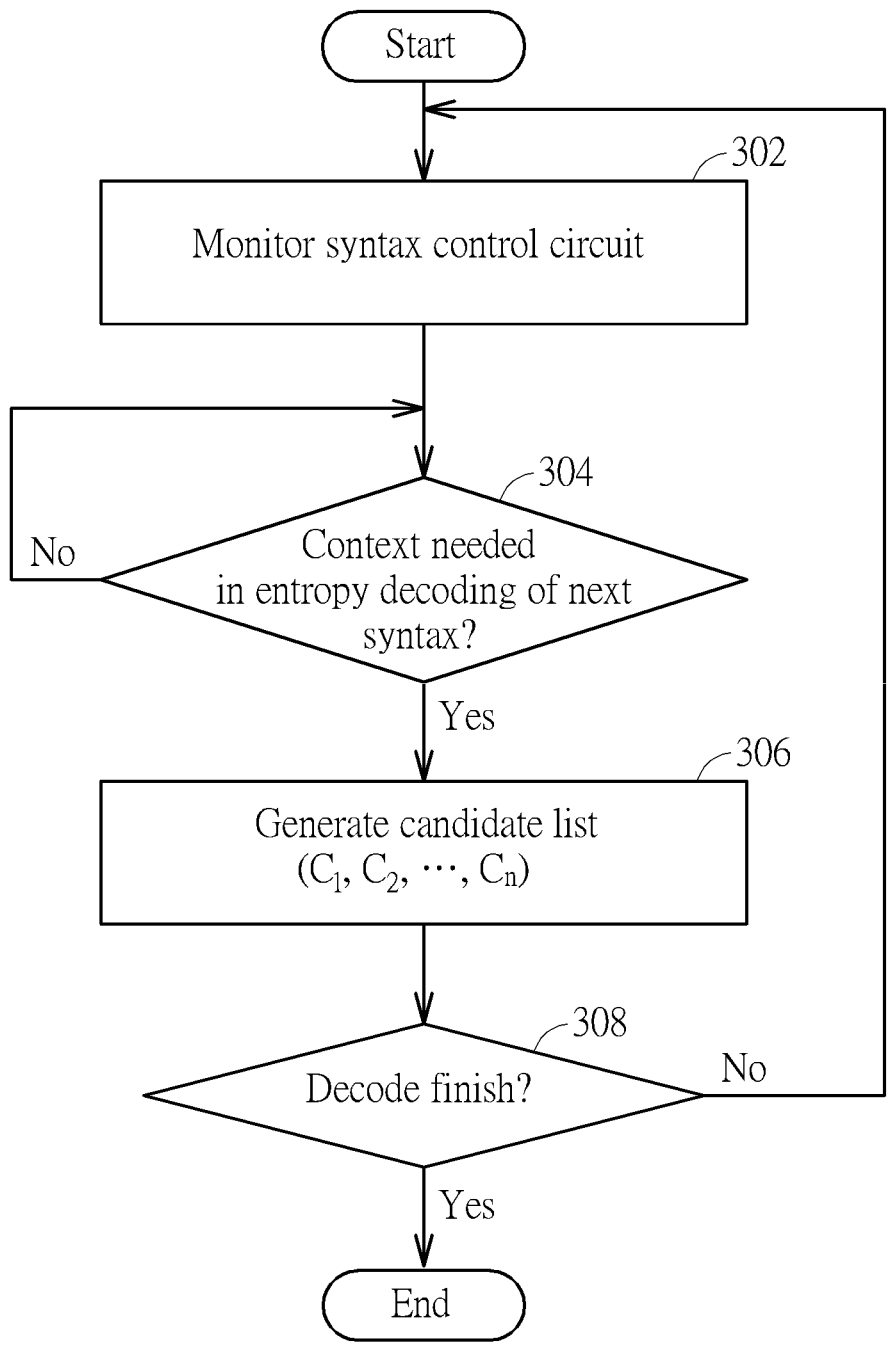
FIG. 3 is a flowchart illustrating a pre-fetch control method according to an embodiment of the present invention.

FIG. 3 is a flowchart illustrating a pre-fetch control method according to an embodiment of the present invention. The pre-fetch control method may be employed by the pre-fetch control circuit 212. Provided that the result is substantially the same, the steps are not required to be executed in the exact order shown in FIG. 3. At step 302, the pre-fetch control circuit 212 monitors the syntax control circuit 202 to know a current status of syntax parsing. At step 304, the pre-fetch control circuit 212 checks if a context (which consists of probability values) is needed by entropy decoding of a next syntax that is a not-yet-decoded syntax. If a context is needed by entropy decoding of the next syntax, the pre-fetch control circuit 212 generates a candidate list ($C_1, C_2, \ldots, C_n$) including one or more candidate contexts. At step 308, the pre-fetch control circuit 212 checks if a decoding process is finished. If the decoding process is not finished yet, the flow proceeds with step 302, such that the pre-fetch control circuit 212 keeps monitoring the syntax control circuit 202.

Figure 4:
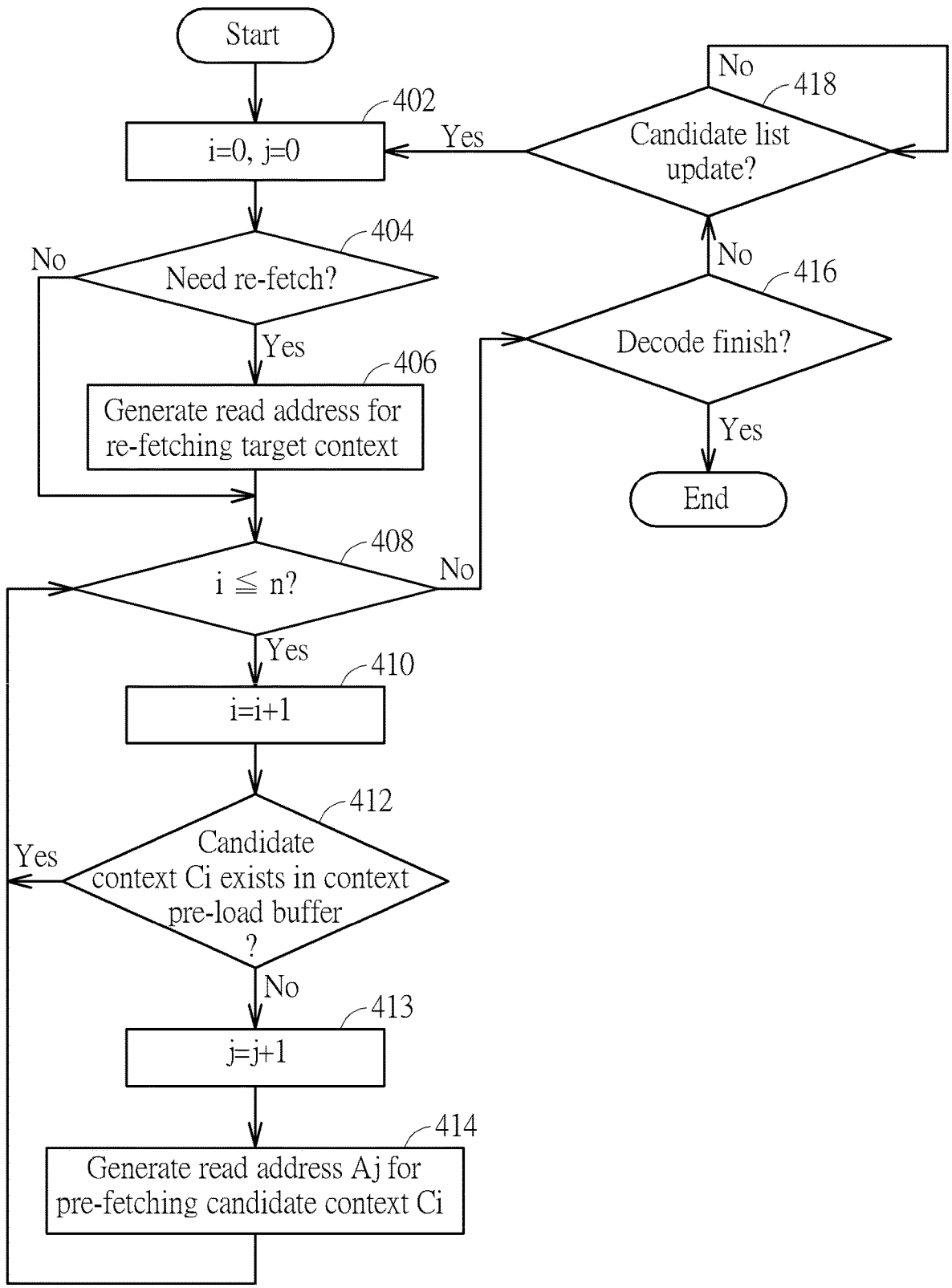
FIG. 4 is a flowchart illustrating an address generation method according to an embodiment of the present invention.

FIG. 4 is a flowchart illustrating an address generation method according to an embodiment of the present invention. The address generation method may be employed by the address generation circuit 214. Provided that the result is substantially the same, the steps are not required to be executed in the exact order shown in FIG. 4. At 402, each of a context index ("i") and an address index ("j") is set by an initial value (e.g., 0). At step 404, the address generation circuit 214 checks if a re-fetch signal is issued from the context pre-load buffer 208. If a context re-fetch operation is needed, the address generation circuit 214 generates a read address used to get a target context needed by entropy decoding of a next syntax that is a not-yet-decoded syntax (step 406). If a context re-fetch operation is not needed, the flow proceeds with step 408. At step 408, the address generation circuit 214 determines if all candidate contexts included in a candidate context list have been checked. If all candidate contexts included in the candidate context list have been checked, the flow proceeds with step 416. If at least one candidate context included in the candidate context list is not checked yet, the address generation circuit 214 updates a context index (step 410), and checks if a candidate context with an updated context index exists in the context pre-load buffer 208 (step 412).

If the candidate context with the updated context index exists in the context pre-load buffer 208, there is no need to fetch the candidate context with the updated context index from the context storage device 206 again, and the flow proceeds with step 408. If the candidate context with the updated context index does not exist in the context pre-load buffer 208, the address generation circuit 214 updates an address index (step 413), generates a read address with an updated address index, and outputs the read address with the updated address index to the context storage device 206 for pre-fetching the candidate context with the updated context index from the context storage device 206. Next, the flow proceeds with step 408.

At step 416, the address generation circuit 214 checks if a decoding process is finished. If the decoding process is not finished yet, the flow proceeds with step 418 to wait for an updated candidate list. When a candidate list is updated due to context prediction for another syntax that is not decoded yet, the flow proceeds with step 402.

It should be noted that one frame may be divided into a plurality of tiles, where each tile has its own probability table for entropy decoding. Hence, all contexts buffered in the context pre-load buffer 208 may be set to be invalid when entropy decoding is switched from a current tile to an adjacent tile.

Figure 5:
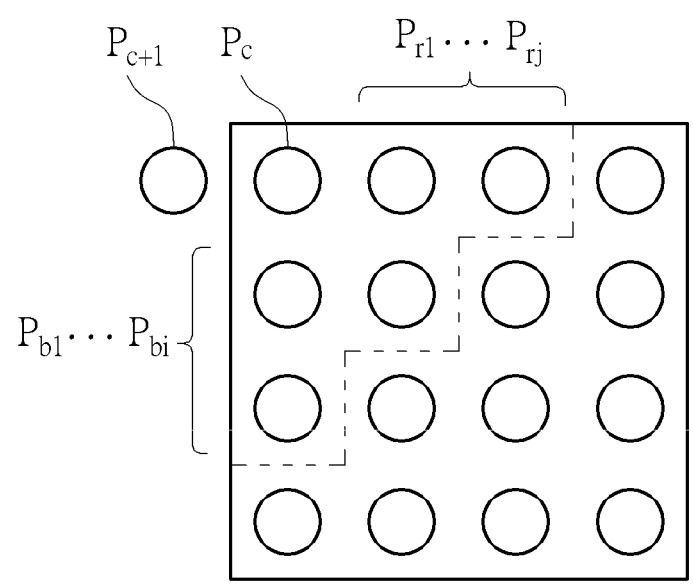
FIG. 5 is a diagram illustrating a square transform shape according to an embodiment of the present invention.
Figure 6:
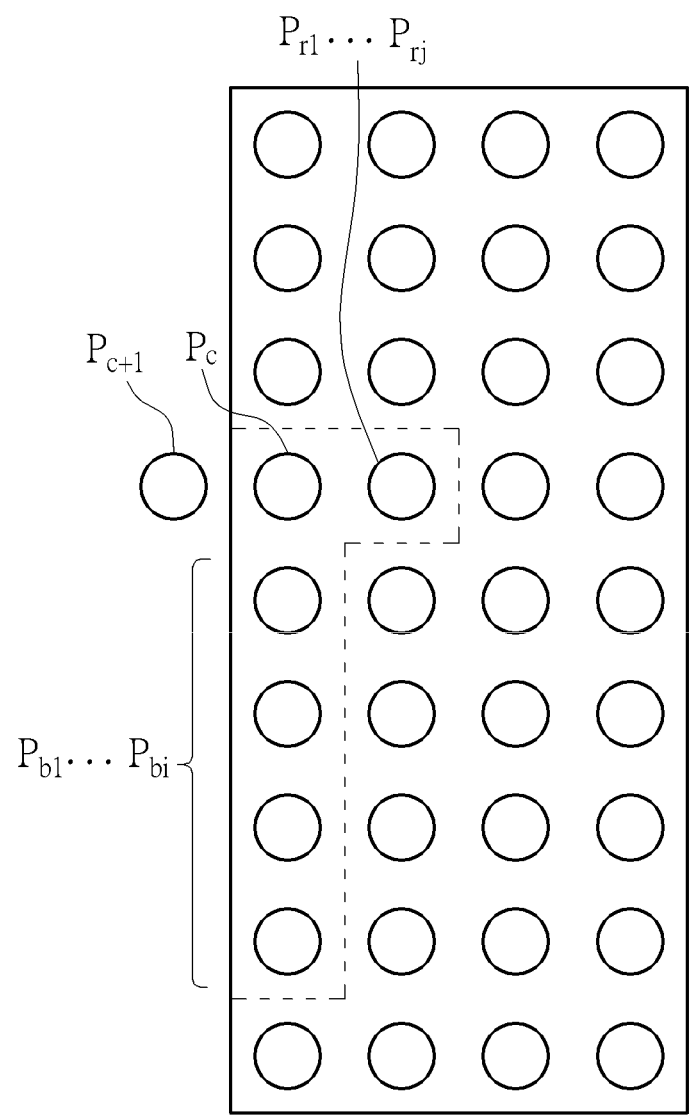
FIG. 6 is a diagram illustrating a vertical transform shape according to an embodiment of the present invention.
Figure 7:
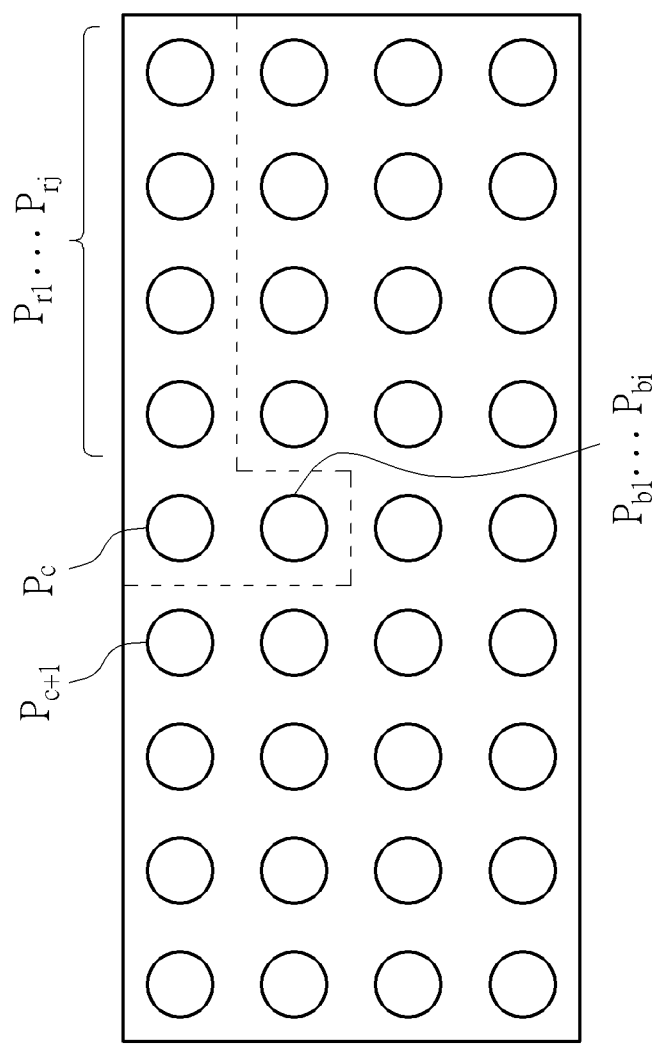
FIG. 7 is a diagram illustrating a horizontal transform shape according to an embodiment of the present invention.

The same context pre-fetch and miss handling concept can be applied to entropy decoding of coefficient syntax. To get better compression rate, a neighbor transform coefficient value that is already entropy decoded can be used for prediction to select a context table for a current transform coefficient to be entropy decoded. The method to select the neighbor transform coefficient value also depends on a shape of coefficient transform. FIG. 5 is a diagram illustrating a square transform shape (I==J) according to an embodiment of the present invention. FIG. 6 is a diagram illustrating a vertical transform shape (I>J) according to an embodiment of the present invention. FIG. 7 is a diagram illustrating a horizontal transform shape (J>I) according to an embodiment of the present invention. The current transform coefficient being decoded is represented by $P_c$. The next transform coefficient to be decoded is represented by $P_{c+1}$. The right neighbor transform coefficient is represented by $P_{rj}$, where J=1~j. The bottom neighbor transform coefficient is represented by $P_{bi}$, where I=1~i. The right bottom neighbor transform coefficient is represented by $P_{rb}$.

The transform coefficients are encoded/decoded backwards along a one-dimensional (1D) array from the most high frequency coefficient towards the direct current (DC) coefficient. For example, when a reverse scan order is adopted, the transform coefficients are encoded/decoded backwards from an EOB (end of block) position of a discrete cosine transform (DCT) coefficient block. Entropy decoding always has a data dependency issue, and the biggest amount of syntax parsing always happens in coefficient decoding. To reduce the decoding bubble, the currently decoded transform coefficient $P_c$ is used for context prediction of the next transform coefficient $P_{c+1}$ to be decoded. However, a design timing critical path includes entropy decoding of a current transform coefficient and context selection of a next transform coefficient, and becomes a clock rate bottleneck. To increase the clock rate in coefficient decoding, the present invention proposes using an entropy decoding apparatus with context pre-fetch and miss handling. The terms "coefficient" and "transform coefficient" may be interchangeable in the following description.

Figure 8:
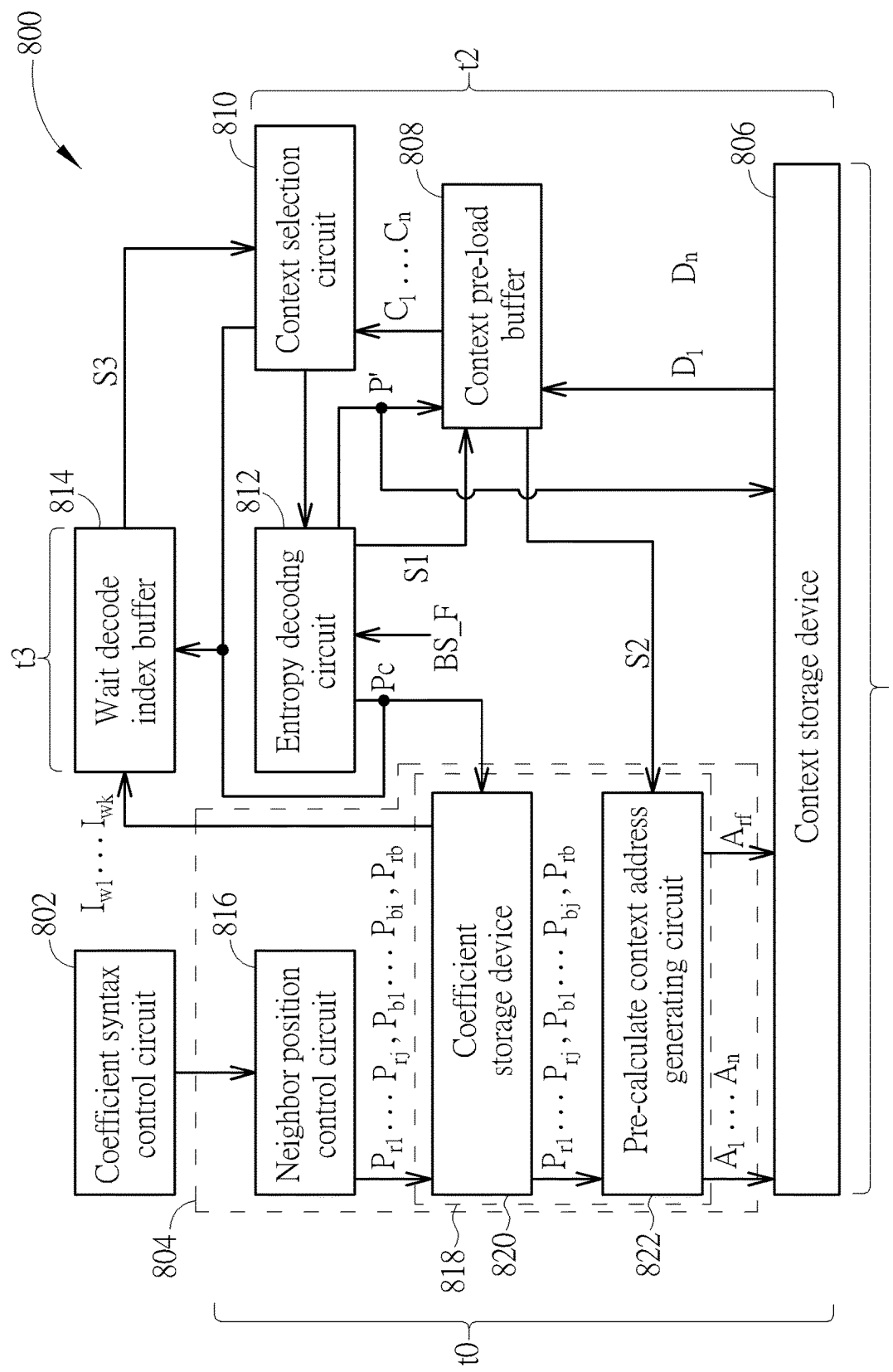
FIG. 8 is a diagram illustrating another entropy decoding apparatus according to an embodiment of the present invention.

FIG. 8 is a diagram illustrating another entropy decoding apparatus according to an embodiment of the present invention. The entropy decoding apparatus 102 shown in FIG. 1 may be implemented using the entropy decoding apparatus 800 shown in FIG. 8. The entropy decoding apparatus 800 includes a coefficient syntax control circuit 802, a pre-fetch circuit 804, a context storage device 806, a context pre-load buffer 808, a context selection circuit 810, an entropy decoding circuit 812, and a wait decode index buffer 814. The pre-fetch circuit 804 includes a neighbor position control circuit 816 and an address generation circuit 818. The address generation circuit 818 includes a coefficient storage device 820 and a pre-calculate context address generating circuit 822.

By way of example, but not limitation, the entropy decoding apparatus 800 is a part of an AV1 video decoder. Hence, the entropy decoding circuit 812 is arranged to perform non-binary entropy decoding upon an encoded bitstream. BS_F of a frame. Since non-binary entropy decoding is adopted, an entropy context table is complex. Since each syntax has its probability values, the entropy context table is large. Furthermore, as mentioned above, a design timing critical path for coefficient decoding includes entropy decoding of a current transform coefficient and context selection of a next transform coefficient, and becomes a clock rate bottleneck. To improve the performance in entropy decoding of coefficient syntax, the present invention proposes using an entropy decoding apparatus with context pre-fetch and miss handling.

The pre-fetch circuit 804 is arranged to pre-fetch at least one candidate context for entropy decoding of a part (e.g., one transform coefficient) of the encoded bitstream BS_F before the entropy decoding circuit 812 starts entropy decoding of the part of the encoded bitstream BS_F, and the context pre-load buffer 808 is arranged to buffer the at least one candidate context fetched from the context storage device 806. The context storage device 806 is arranged to store an entire context table (entire probability table) of a frame, while the context pre-load buffer 808 is arranged to store a partial context table (partial probability table) of the frame. In other words, contexts of all syntax (syntax elements) associated with one frame are available in the context storage device 806, while contexts of only a portion of syntax (syntax elements) associated with one frame are available in the context pre-load buffer 808.

In this embodiment, the context pre-load buffer 808 may be implemented using on-chip (internal) storage (e.g., SRAM or flip-flips); and the context storage device 808 may be implemented using on-chip (internal) storage (e.g., SRAM or flip-flops), off-chip (external) storage (e.g., DRAM, flash memory, or hard disk), or a combination of on-chip (internal) storage and off-chip (external) storage. However, these are for illustrative purposes only, and are not meant to be limitations of the present invention.

In a case where a target context needed by the entropy decoding circuit (which acts as a coefficient decoder) 812 is pre-fetched and stored in the context pre-load buffer 808, the context pre-load buffer 808 can help the entropy decoding circuit 812 to get the needed context faster. In this way, the entropy decoding performance of transform coefficients can be effectively improved. Further details of the context pre-fetch mechanism are described as below.

The coefficient syntax control circuit 802 is arranged to deal with coefficient syntax parsing flow control. Hence, entropy decoding of coefficient syntax at the entropy decoding circuit 812 is controlled by the coefficient syntax control circuit 802. The neighbor position control circuit 816 is arranged to monitor the coefficient syntax parsing flow control performed at the coefficient syntax control circuit 802, refer to a current status of the coefficient syntax parsing flow control to determine a next coefficient position at which a next transform coefficient not yet decoded by the entropy decoding circuit 812 is located, and determine neighbor position indexes ($I_{r1}, \ldots I_{rj}, I_{b1}, \ldots I_{bi}, I_{rb}$) of neighbor transform coefficients in the proximity of the next transform coefficient according to the next coefficient position and a transform shape. The term "next transform coefficient" may mean any "not-yet-decoded transform coefficient" while a decoding process of a current transform coefficient is still in operation.

The neighbor position indexes ($I_{r1}, \ldots I_{rj}, I_{b1}, \ldots I_{bi}, I_{rb}$) are provided to the coefficient storage device 820. The coefficient storage device 820 is arranged to store decoded transform coefficients derived from decoding results of the entropy decoding circuit 812, and outputs at least one decoded transform coefficient that is available in the coefficient storage device 820 and indexed by at least one of the neighbor position indexes ($I_{r1}, \ldots I_{rj}, I_{b1}, \ldots I_{bi}, I_{rb}$). The coefficient storage device 820 acts as a coefficient queue. For example, decoding results of the entropy decoding circuit 812 may be directly stored into the coefficient storage device 820 as decoded transform coefficients. For another example, decoding results of the entropy decoding circuit 812 may be pre-processed (e.g., clamped) and then stored into the coefficient storage device 820 as decoded transform coefficients.

In a case where decoded transform coefficients ($P_{r1} \ldots P_{rj}$, $P_{b1} \ldots P_{bi}$, $P_{rb}$) indexed by the neighbor position indexes ($I_{r1}, \ldots I_{rj}, I_{b1}, \ldots I_{bi}, I_{rb}$) are all available in the coefficient storage device 820, the coefficient storage device 820 provides the decoded transform coefficients ($P_{r1} \ldots P_{rj}$, $P_{b1} \ldots P_{bi}$, $P_{rb}$) to the pre-calculate context address generating circuit 822. In another case where not all of decoded transform coefficients ($P_{r1} \ldots P_{rj}, P_{b1} \ldots P_{bi}, P_{rb}$) indexed by the neighbor position indexes ($I_{r1}, \ldots I_{rj}, I_{b1}, \ldots I_{bi}, I_{rb}$) are available in the coefficient storage device 820, the coefficient storage device 820 provides existing decoded transform coefficients (i.e., a subset of decoded transform coefficients ($P_{r1} \ldots P_{rj}, P_{b1} \ldots P_{bi}, P_{rb}$)) to the pre-calculate context address generating circuit 822 only.

The pre-calculate context address generating circuit 822 is arranged to determine at least one read address ($A_1$, $A_2, \ldots, A_n$) according to at least one decoded transform coefficient ($P_{r1} \ldots P_{rj}, P_{b1} \ldots P_{bi}, P_{rb}$) that is output from the coefficient storage device 820 in response to the neighbor position indexes ($I_{r1}, \ldots I_{rj}, I_{b1}, \ldots I_{bi}, I_{rb}$), where n is a positive integer that is not smaller than one (i.e., $n \geq 1$).

In this embodiment, the address generation circuit 818 is arranged to determine at least one read address ($A_1$, $A_2, \ldots, A_n$) according to the neighbor position indexes ($I_{r1}, \ldots I_{rj}, I_{b1}, \ldots I_{bi}, I_{rb}$). The context storage device 806 outputs at least one candidate context ($D_1, D_2, \ldots, D_n$) to the context pre-load buffer 808, where the at least one candidate context ($D_1, D_2, \ldots, D_n$) is addressed by at least one read address ($A_1, A_2, \ldots, A_n$). Specifically, the candidate context $D_1$ is read from the context storage device 806 in response to the read address $A_1$, the candidate context $D_2$ is read from the context storage device 806 in response to the read address $A_2$, and the candidate context $D_n$ is read from the context storage device 806 in response to the read address $A_n$.

The entropy decoding apparatus 800 may employ a coefficient-level pipeline structure to decode transform coefficients in a pipeline processing manner. Hence, the pre-fetch circuit 804 may be a part of one pipeline phase (pipeline stage) which performs context prediction for a transform coefficient at the time one or more transform coefficients are currently undergoing pipeline processing at other pipeline phases (pipeline stages). In this embodiment, the coefficient storage device 820 is further arranged to output at least one wait index ($I_{w1}, \ldots, I_{wk}$) of at least one transform coefficient, each being currently undergoing a decoding process that is started but not finished yet, where k is a positive integer not smaller than one (i.e., $k \geq 1$). The wait decode index buffer 814 may be implemented by a first-in first-out (FIFO) buffer, and is arranged to store the at least one wait index ($I_{w1}, \ldots, I_{wk}$). For example, while context prediction of a transform coefficient $P_{c+3}$ is being performed at one pipeline phase, previous transform coefficients $P_c$, $P_{c+1}$, and $P_{c+2}$ are stilled processed at other pipeline phases and are not finally decoded yet. The wait decode index buffer 814 stores wait indexes generated from the coefficient storage device 820, where the stored wait indexes include index values of the transform coefficients $P_c$, $P_{c+1}$, and $P_{c+2}$.

When a value of a current transform coefficient $P_c$ is decoded and output from the entropy decoding circuit 812, the wait decode index buffer 814 checks if an index value of the current transform coefficient $P_c$ matches any stored wait index. When the index value of the current transform coefficient $P_c$ is equal to one wait index stored in the wait decode index buffer 814, the wait decode index buffer 814 asserts an equal signal S3 indicating that a decoded value of the current transform coefficient $P_c$ is available to context selection for a next transform coefficient $P_{c+1}$. The context selection circuit 810 is arranged to select a target context required by entropy decoding of the next transform coefficient $P_{c+1}$ according to a decoded value of the current transform coefficient $P_c$ with an index value equal to one of the wait indexes stored in the wait decode index buffer 814.

As mentioned above, after a pipelined decoding process of a current transform coefficient is started and before the entropy decoding circuit 812 starts entropy decoding (particularly, non-binary entropy decoding) of a next transform coefficient, the context pre-load buffer 808 stores candidate contexts ($C_1, \ldots, C_n$) that are pre-fetched from the context storage device 806 according to neighbor coefficient based context prediction.

In a case where a target context actually needed by entropy decoding (particularly, non-binary entropy decoding) of the next transform coefficient is available in the context pre-load buffer 808 (i.e., the target context is one of candidate contexts ($C_1, \ldots, C_n$)), the context selection circuit 810 selects the target context according to a decoding result of the current transform coefficient, and provides the target context obtained from the context pre-load buffer 808 to the entropy decoding circuit 812 without accessing the context storage device 806. In some embodiments of the present invention, the read latency of the context pre-load buffer 808 is much lower than the read latency of the context storage device 806, and/or the date transfer rate of the context pre-load buffer 808 is much higher than the data transfer rate of the context storage device 806. In this way, entropy decoding benefits from low latency and/or high transfer rate of the context pre-load buffer 808 that stores the needed context in advance. After entropy decoding (particularly, non-binary entropy decoding) of the next transform coefficient is done, the entropy decoding circuit 812 applies adaptive update to the target context P' (which is one of candidate contexts ($C_1, \ldots, C_n$)) stored in context pre-load buffer 808 and/or context storage device 806.

In another case where a target context actually needed by entropy decoding (particularly, non-binary entropy decoding) of the next transform coefficient is not available in the context pre-load buffer 808 (i.e., none of candidate contexts ($C_1, \ldots, C_n$) is the target context), a proposed miss handling mechanism is actuated. For example, the entropy decoding circuit 812 stalls entropy decoding (particularly, non-binary entropy decoding) of the next transform coefficient, and asserts a miss signal S1 to inform the context pre-load buffer 808 of a context miss event. The context pre-load buffer 808 generates a re-fetch signal S2 and outputs the re-fetch signal S2 to the pre-calculate context address generating circuit 822 in response to the asserted miss signal S1. The pre-calculate context address generating circuit 822 is further arranged to determine another read address $A_{rf}$ according to the re-fetch signal S2, where the target context is fetched from the context storage device 806 in response to another read address $A_{rf}$ and is provided to the entropy decoding circuit 812 by the context selection circuit 810 via (or without via) the context pre-load buffer 808. After the target context fetched from the context storage device 806 is available to the entropy decoding circuit 812, the entropy decoding circuit 812 resumes entropy decoding (particularly, non-binary entropy decoding) of the next transform coefficient. Similarly, after entropy decoding (particularly, non-binary entropy decoding) of the next transform coefficient is done, the entropy decoding circuit 812 applies adaptive update to the target context P' stored in context pre-load buffer 808 and/or context storage device 806.

Figure 9:
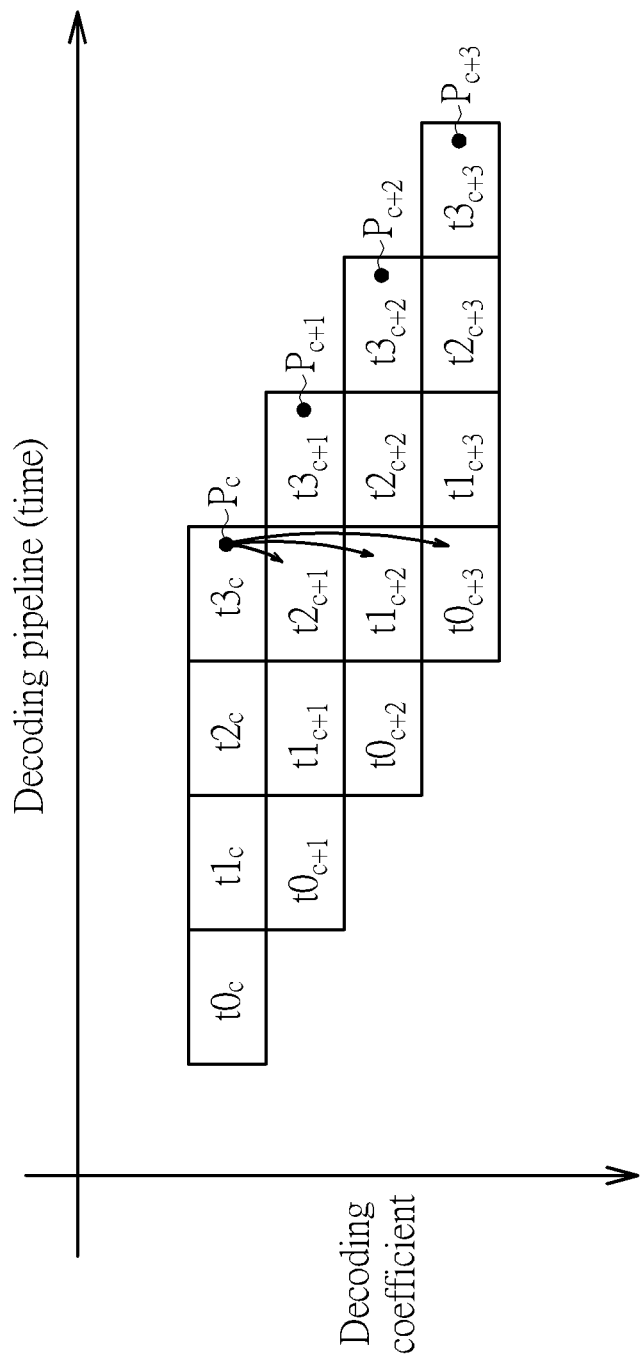
FIG. 9 is a timing diagram of a pipelined decoding process according to an embodiment of the present invention.

Please refer to FIG. 8 in conjunction with FIG. 9. FIG. 9 is a timing diagram of a pipelined decoding process according to an embodiment of the present invention. The pipelined decoding process is performed at the entropy decoding apparatus 800. In this embodiment, the pipelined decoding process for each transform coefficient includes four pipeline phases t0, t1, t2, and t3. By way of example, but not limitation, each of the pipeline phases t0, t1, t2, and t3 may finish its designated task in a single cycle. As shown in FIG. 9, pipeline phases associated with syntax decoding of the transform coefficient $P_c$ are denoted by $t0_c$, $t1_c$, $t2_c$, and $t3_c$; pipeline phases associated with syntax decoding of the transform coefficient $P_{c+1}$ are denoted by $t0_{c+1}$, $t1_{c+1}$, $t2_{c+1}$, and $t3_{c+1}$; pipeline phases associated with syntax decoding of the transform coefficient $P_{c+2}$ are denoted by $t0_{c+2}$, $t1_{c+2}$, $t2_{c+2}$, and $t3_{c+2}$; and pipeline phases associated with syntax decoding of the transform coefficient $P_{c+3}$ are denoted by $t0_{c+3}$, $t1_{c+3}$, $t2_{c+3}$, and $t3_{c+3}$. The transform coefficients $P_c$, $P_{c+1}$, $P_{c+2}$, and $P_{c+3}$ are entropy decoded one by one according to a decoding order.

The pipeline phase t0 is a context prediction phase that predicts candidate context addresses on the basis of neighbor coefficients and the transform shape. The pipeline phase t1 is a context read phase that reads candidate contexts from the context storage device 806. The pipeline phase t2 is a context selection phase that performs context selection for a not-yet-decoded transform coefficient according to a coefficient value of an already-decoded transform coefficient, and provides a target context needed by entropy decoding of the not-yet-decoded transform coefficient to the entropy decoding circuit 812, where the target context obtained from the context storage device 806 may be provided to the entropy decoding circuit 812 via (or without via) the entropy pre-load buffer 808. For example, if the target context is obtained from the context storage device 806 due to context re-fetch, the entropy pre-load buffer 808 may bypass it to the entropy decoding circuit 812. The pipeline phase t3 is a coefficient decoding phase that generates and outputs a decoded value of a transform coefficient that is further referenced by context selection or context prediction for at least one not-yet-decoded transform coefficient. As shown in FIG. 9, a decoded value of the transform coefficient $P_c$ is generated and output at the pipeline phase $t3_c$, a decoded value of the transform coefficient $P_{c+1}$ is generated and output at the pipeline phase $t3_{c+1}$, a decoded value of the transform coefficient $P_{c+2}$ is generated and output at the pipeline phase $t3_{c+2}$, and a decoded value of the transform coefficient $P_{c+3}$ is generated and output at the pipeline phase $t3_{c+3}$. The decoded value of the transform coefficient $P_c$ at the pipeline phase $t3_c$ can be used by context selection for the transform coefficient $P_{c+1}$ at the pipeline phase $t2_{c+1}$, and/or can be used by context prediction for the transform coefficient $P_{c+3}$ at the pipeline phase $t0_{c+3}$.

It should be noted that one frame may be divided into a plurality of tiles, where each tile has its own probability table for entropy decoding. Hence, all contexts buffered in the context pre-load buffer 808 may be set to be invalid when entropy decoding is switched from a current tile to an adjacent tile.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An entropy decoding apparatus comprising:
   an entropy decoding circuit;
   a pre-fetch circuit, arranged to pre-fetch at least one candidate context for entropy decoding of a part of an encoded bitstream of a frame before the entropy decoding circuit starts entropy decoding of the part of the encoded bitstream of the frame; and
   a context pre-load buffer, arranged to buffer said at least one candidate context, wherein when a target context actually needed by entropy decoding of the part of the encoded bitstream of the frame is not available in the context pre-load buffer, the context pre-load buffer instructs the pre-fetch circuit to re-fetch the target context, and the entropy decoding circuit stalls entropy decoding of the part of the encoded bitstream of the frame.

2. The entropy decoding apparatus of claim 1, wherein the entropy decoding circuit is arranged to perform non-binary entropy decoding upon the part of the encoded bitstream of the frame.

3. The entropy decoding apparatus of claim 1, further comprising:
   a syntax control circuit, arranged to deal with syntax parsing flow control;
   wherein the pre-fetch circuit comprises:
   a pre-fetch control circuit, arranged to monitor the syntax parsing flow control performed at the syntax control circuit, and refer to a current status of the syntax parsing flow control to predict a next syntax not yet decoded by the entropy decoding circuit for building a candidate context list that indicates said at least one candidate context; and
   an address generation circuit, arranged to determine at least one read address according to the candidate context list, wherein said at least one candidate context is pre-fetched from a storage device in response to said at least one read address.

4. The entropy decoding apparatus of claim 3, wherein the candidate context list further includes at least one extra candidate context; and after receiving the candidate context list, the address generation circuit is further arranged to monitor a buffer status of the context pre-load buffer, and refer to the buffer status of the context pre-load buffer to remove said at least one extra candidate context from the candidate context list, where said at least one extra candidate context is already buffered in the context pre-load buffer.

5. The entropy decoding apparatus of claim 3, wherein the address generation circuit is further arranged to determine another read address according to a re-fetch signal generated from the context pre-load buffer, where said target context is fetched from the storage device in response to said another read address.

6. The entropy decoding apparatus of claim 3, wherein the entropy decoding circuit is further arranged to apply adaptive update to the target context stored in the context pre-load buffer after entropy decoding of the part of the encoded bitstream of the frame is done.

7. The entropy decoding apparatus of claim 1, further comprising:
   a coefficient syntax control circuit, arranged to deal with coefficient syntax parsing flow control;
   wherein the pre-fetch circuit comprises:
   a neighbor position control circuit, arranged to monitor the coefficient syntax parsing flow control performed at the coefficient syntax control circuit, refer to a current status of the coefficient syntax parsing flow control to determine a next coefficient position at which a next transform coefficient not yet decoded by the entropy decoding circuit is located, and determine neighbor position indexes of neighbor transform coefficients in the proximity of the next transform coefficient according to the next coefficient position and a transform shape; and an address generation circuit, arranged to determine at least one read address according to the neighbor position indexes, wherein said at least one candidate context is pre-fetched from a storage device in response to said at least one read address.

8. The entropy decoding apparatus of claim 7, wherein the address generation circuit comprises:

a coefficient storage device, arranged to store decoded transform coefficients derived from decoding results of the entropy decoding circuit, and output at least one decoded transform coefficient that is available in the coefficient storage device and indexed by at least one of the neighbor position indexes; and a pre-calculate context address generating circuit, arranged to determine said at least one read address according to said at least one decoded transform coefficient.

9. The entropy decoding apparatus of claim 8, wherein the pre-calculate context address generating circuit is further arranged to determine another read address according to a re-fetch signal generated from the context pre-load buffer, where said target context is fetched from the storage device in response to said another read address.

10. The entropy decoding apparatus of claim 7, wherein the coefficient storage device is further arrange to output at least one wait index of at least one transform coefficient, each being currently undergoing a decoding process that is started but not finished yet; and the entropy decoding apparatus further comprises:

a wait decode index buffer, arranged to store said at least one wait index; and a context selection circuit, arranged to select the target context required by entropy decoding of the next transform coefficient according to a decoded value of a current transform coefficient with an index value equal to one of said at least one wait index stored in the wait decode index buffer.

11. An entropy decoding method comprising:

pre-fetching at least one candidate context for entropy decoding of a part of an encoded bitstream of a frame before entropy decoding of the part of the encoded bitstream of the frame is started;

buffering, by a context pre-load buffer, said at least one candidate context; and when a target context actually needed by entropy decoding of the part of the encoded bitstream of the frame is not available in the context pre-load buffer, re-fetching the target context and stalling entropy decoding of the part of the encoded bitstream of the frame.

12. The entropy decoding method of claim 11, wherein non-binary entropy decoding is applied to the part of the encoded bitstream of the frame.

13. The entropy decoding method of claim 11, further comprising:

monitoring syntax parsing flow control;

referring to a current status of the syntax parsing flow control to predict a next syntax not yet entropy decoded for building a candidate context list that indicates said at least one candidate context; and determining at least one read address according to the candidate context list, wherein said at least one candidate context is pre-fetched from a storage device in response to said at least one read address.

14. The entropy decoding method of claim 13, further comprising:

determining another read address according to a re-fetch signal generated from the context pre-load buffer, where said target context is fetched from the storage device in response to said another read address.

15. The entropy decoding method of claim 13, further comprising:

applying adaptive update to the target context stored in the context pre-load buffer after entropy decoding of the part of the encoded bitstream of the frame is done.

16. The entropy decoding method of claim 13, wherein the candidate context list further includes at least one extra candidate context; and determining said at least one read address according to the candidate context list comprises:

after receiving the candidate context list, monitoring a buffer status of the context pre-load buffer, and referring to the buffer status of the context pre-load buffer to remove said at least one extra candidate context from the candidate context list, where said at least one extra candidate context is already buffered in the context pre-load buffer.

17. The entropy decoding method of claim 11, further comprising: monitoring coefficient syntax parsing flow control;

referring to a current status of the coefficient syntax parsing flow control to determine a next coefficient position at which a next transform coefficient not yet entropy decoded is located; and determining neighbor position indexes of neighbor transform coefficients in the proximity of the next transform coefficient according to the next coefficient position and a transform shape; and determining at least one read address according to the neighbor position indexes, wherein said at least one candidate context is pre-fetched from a storage device in response to said at least one read address.

18. The entropy decoding method of claim 17, wherein determining said at least one read address according to the neighbor position indexes comprises:

storing, by a coefficient storage device, decoded transform coefficients that are derived from decoding results of entropy decoding;

outputting at least one decoded transform coefficient that is available in the coefficient storage device and indexed by at least one of the neighbor position indexes; and determining said at least one read address according to said at least one decoded transform coefficient.

19. The entropy decoding method of claim 18, further comprising:

determining another read address according to a re-fetch signal generated from the context pre-load buffer, where said target context is fetched from the storage device in response to said another read address.

20. The entropy decoding method of claim 17, further comprising:

outputting at least one wait index of at least one transform coefficient, each being currently undergoing a decoding process that is started but not finished yet;

storing, by a wait decode index buffer, said at least one wait index; and selecting the target context required by entropy decoding of the next transform coefficient according to a decoded value of a current transform coefficient with an index value equal to one of said at least one wait index stored in the wait decode index buffer.

\* \* \* \* \*